United States Patent
Reddy et al.

(10) Patent No.: US 7,880,119 B2
(45) Date of Patent: Feb. 1, 2011

(54) ONE SIDED ELECTRODE FOR MANUFACTURING PROCESSES ESPECIALLY FOR JOINING

(75) Inventors: GS Reddy, Cincinnati, OH (US); JA Sekhar, Cincinnati, OH (US)

(73) Assignee: Micropyretics Heaters International, Inc., Cincinnati, OH (US)

( * ) Notice: Subject to any disclaimer, the term of this patent is extended or adjusted under 35 U.S.C. 154(b) by 1020 days.

(21) Appl. No.: 11/098,474

(22) Filed: Apr. 5, 2005

(65) Prior Publication Data
US 2006/0219681 A1 Oct. 5, 2006

(51) Int. Cl.
*B23K 9/06* (2006.01)
*H01T 14/00* (2006.01)

(52) U.S. Cl. ............. 219/130.4; 219/76.13; 219/76.14; 219/121.11; 219/121.35; 219/637; 427/580

(58) Field of Classification Search ............ 219/121.11, 219/121.35, 68–70, 76.13, 76.14, 76.16, 219/637; 427/575, 580
See application file for complete search history.

(56) References Cited

U.S. PATENT DOCUMENTS

| | | | | |
|---|---|---|---|---|
| 2,908,800 A | * | 10/1959 | Breymeier | 219/74 |
| 3,309,564 A | * | 3/1967 | Poulsen | 219/121.11 |
| 3,358,114 A | * | 12/1967 | Inoue | 219/76.13 |
| 3,524,041 A | * | 8/1970 | Manz | 219/137 R |
| 3,617,684 A | * | 11/1971 | Di Mino | 219/121.11 |
| 3,648,015 A | * | 3/1972 | Fairbairn | 219/121.35 |
| 4,950,865 A | * | 8/1990 | Aurandt | 219/121.11 |
| 5,296,667 A | * | 3/1994 | Marantz et al. | 219/121.47 |
| 6,555,779 B1 | * | 4/2003 | Obana et al. | 219/121.63 |

FOREIGN PATENT DOCUMENTS

JP 63033177 A * 2/1988

* cited by examiner

*Primary Examiner*—Stephen J Ralis
(74) *Attorney, Agent, or Firm*—Schwegman, Lundberg & Woessner, P.A.

(57) ABSTRACT

A process whereby a one sided electrode is allowed to discharge to essentially its own potential field is presented. The process may be utilized for joining by discharging particles as well as for spot welding or other heating purposes. Examples of several uses are given and the electrical diagram for such a discharger is also shown.

14 Claims, 5 Drawing Sheets

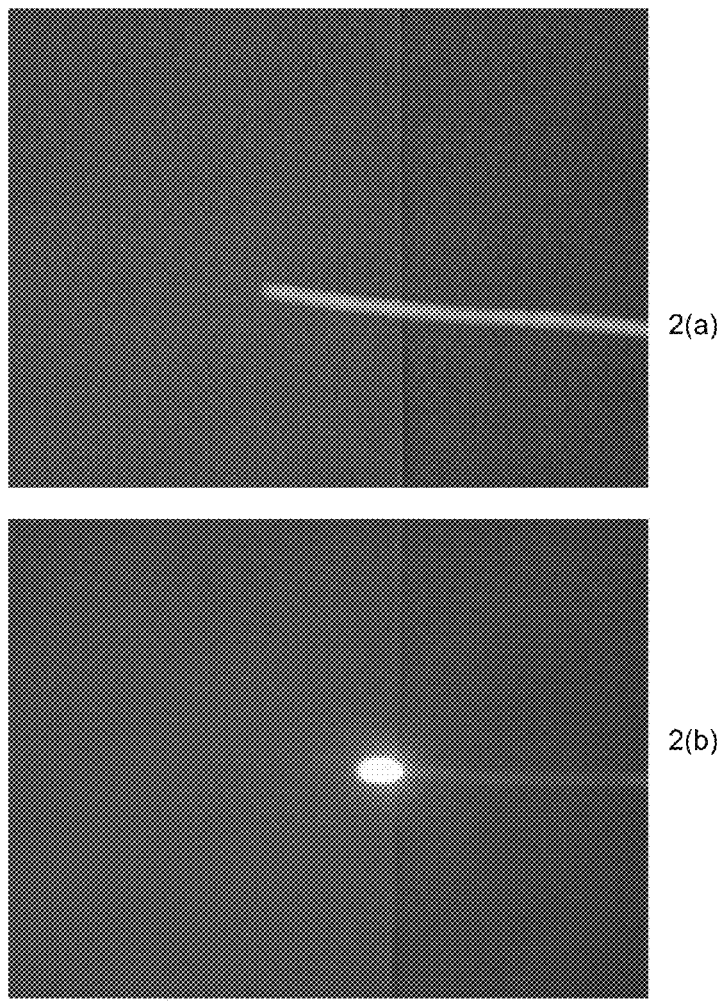
2(a)
2(b)
Figure 2(a) above showing iron alloy wire prior to energizing and 2(b) below the same wire discharging. Note this is a one sided electrode. The vertical line in the background is an artifact from the black backdrop for the picture and has no significance to the invention.

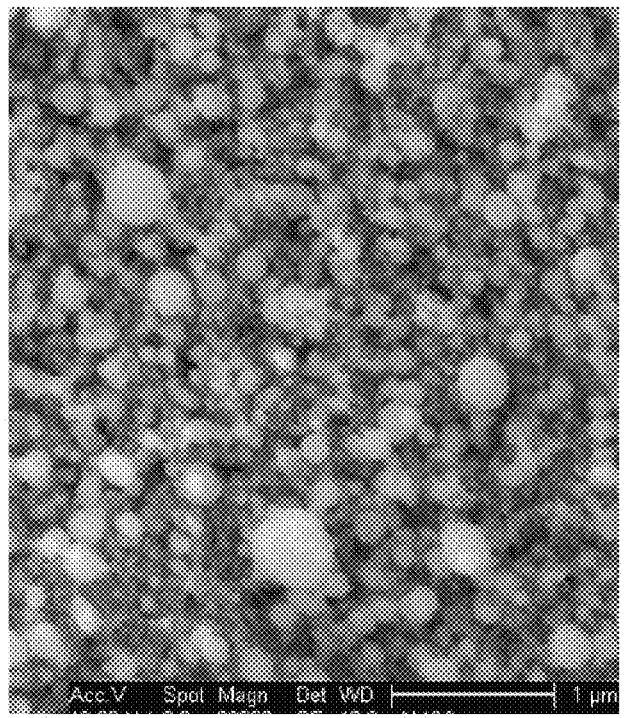
Figure 3. Aluminum particles collected from the discharge. Note that these were hot as discharged and were able to stick to the copper surface. Such particles may be used as filler materials for joining purposes.

ONE SIDED ELECTRODE FOR MANUFACTURING PROCESSES ESPECIALLY FOR JOINING

BACKGROUND

During normal electric arc welding the arc is formed between a pointed electrode (often made from tungsten) and the work-piece which servers as the second electrode often grounded (this form of discharge between two electrodes one of which may be grounded is called a two sided discharge). This requirement of a two sided electrode for welding is often the cause for problems associated with the electrical circuitry. If a one sided electrode is possible, many different possibilities otherwise not feasible in conventional arc welding become available to the welding engineer. For a comprehensive reference see Gas Tungsten Arc Welding Handbook by William H. Minnick, 1999 and Welders Handbook, R. Finch, Berkeley Publishing Group, NY, 1997.

Power Source

For two sided electrodes, although an alternating type (sine wave) power source is useful, arcs are normally not readily stabilized with sine wave AC. Arc re-ignition is difficult when there is a long electrode to work-piece distance. Special-purpose switched DC power sources are now becoming available to overcome such problems. By un-balancing the waveform to reduce the duration of electrode positive polarity, the electrode is kept sufficiently cool to maintain a pointed tip and achieve arc stability. Such electronics often add to the overall cost. In addition such processes have the disadvantage that arc starting is often a difficult process.

Electrode

The fact that two electrodes, one of which may be grounded adds to the cost of welding regardless of the fact whether they are consumable or not. Two electrodes are normally effectively required for welding and one of them is often the work piece. The arc or plasma-arc travels from one electrode to the other and if either electrode is removed the arcing (and thus the welding) stops. The electrode used commonly for the arc process for example is a costly e.g. tungsten-2% thoria an expensive material. Shielding gasses are also required. The normal combination of gases used are argon for the gas, with argon plus 2 to 5% hydrogen for the shielding gas, again all costly and somewhat dangerous because of the hydrogen.

SUMMARY

In this invention a one sided discharge is taught where such a discharge allows either heat or particles from the discharge to become available for welding. In such a method, welding can be effectively carried out in a micro or large scale. The particles can act as the filler material thus reducing the need for more fillers. In this manner heat and mass can be usefully and simultaneously transferred to a workpiece.

BRIEF DESCRIPTION OF THE FIGURES

FIG. 2A is a diagram of iron alloy wire.

FIG. 2B is a diagram of a discharge of one end of the iron allow wire depicted in FIG. 2A.

FIG. 3 is a diagram of a scanning electron microscope of aluminum particles collected from the discharge of an aluminum wire onto a copper surface.

The singular aim of the invention is to create an extremely high potential localized point in a material which will continuously disintegrate and discharge when it experiences very high frequency alternating (sine wave type) current, thus producing heat and heated mass either during or subsequent to the discharge. This is called a once sided electrode method. No second electrode is required. If a work-piece is involved such as for example a welding fixture or a substrate to be coated, it does not have to be grounded in any manner. The discharge can take place to open air or gas or any other dielectric fluid which has a low electrical conductivity. The alternating current can have a variety of other frequencies superimposed on (Fourier deconvolution).

By creating an immense potential point, an unstable situation is created which can lead to a metallic discharger apparatus proposed herein or the proposed method of discharger. The basic theory of operation of the metallic discharger is as follows: The metallic discharger can be created with the use of a modified high powered high frequency generator having a frequency preferably, but not limited to, in the range from 0.001 to 1000 Megahertz. For example a modified amplifier is connected to an output tank coil which is in a parallel resonant circuit (also commonly called a pi circuit) which, when tuned to resonance has a very high impedance and consequently high voltage across it. If the electrode is very fine the voltage moves to the end of the electrode. This high, potential energy had no place to go other than out at the end point of a wire or attached fine rod which projects into the atmosphere. This energy, as it rushed out at the small end point of the rod, causes the rod to get red hot and emit an arc like discharge.

A new unique method of the use of such a basic metallic discharger has now been discovered. It was discovered that the characteristic of the metallic discharger could be used as a way of making particles which can cause welding or coating because they posses both heat and kinetic energy in the discharge.

DESCRIPTION OF FIGURES

FIGS. 1a-1b, 2a-2b, and 3 describe the invention but are not intended to be limiting. The figures are described in detail below. The FIGS. 1 and 2 consists of two figures (a) and (b).

Figure 1A:
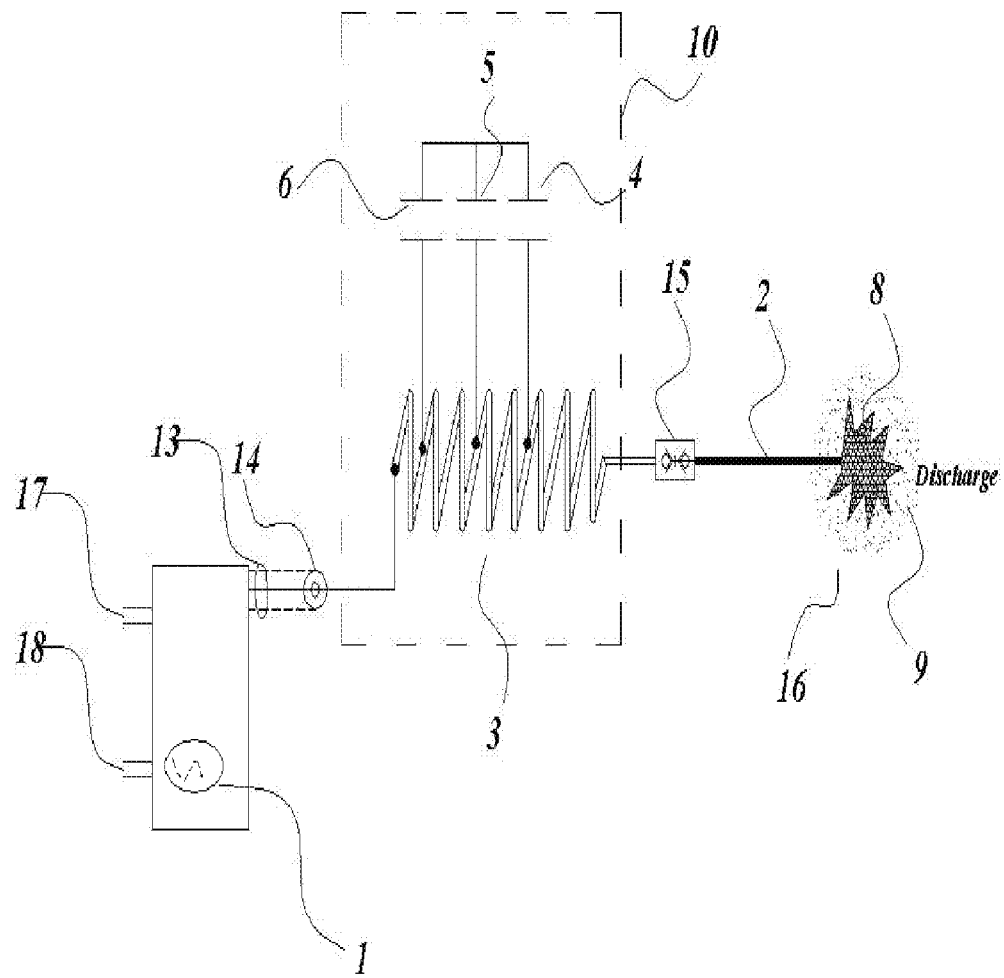
FIG. 1 is a diagram of a one-sided electrode for a manufacturing process, according to an example embodiment of the invention.
Figure 1B:
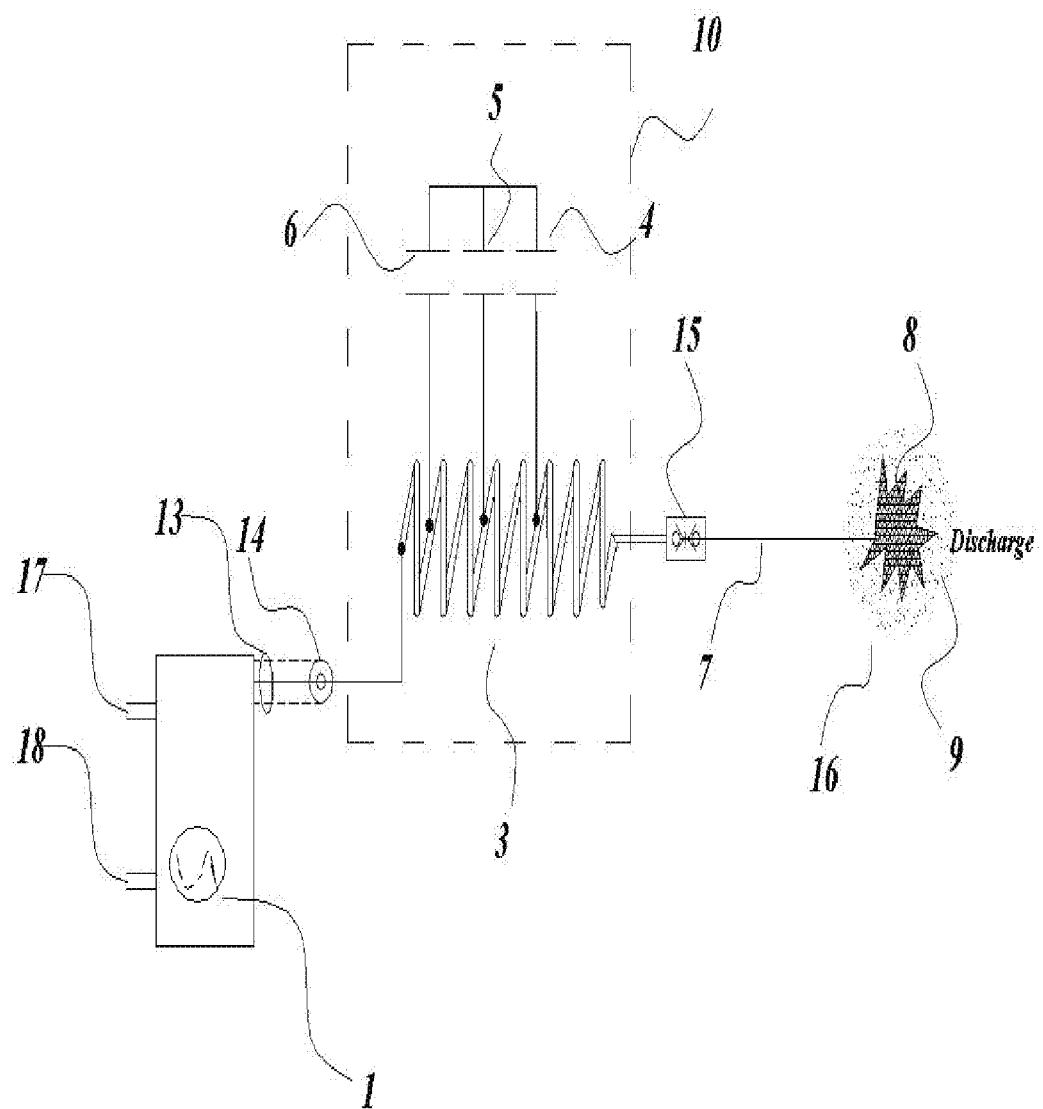

FIGS. 1a-1b show a schematic of the apparatus for the method of the invention. 1 is the high frequency generator (which often needs water cooling). This can be a single or multi phase unit. Such units are commercially available. If the output is taken from the generator (no grounding to the output) and attached to an inductor 3 which is connected to one or many capacitors 4, 5 and 6 so as to form a traditional "pi" type circuit 10 then a wire 7 (FIG. 1(b)) of the same material 7 or a new wire 7 (FIG. 1(b)) or rod 2 (FIG. 1(a)) or electrode may be attached to give a protruded electrode, wire 7 or rod 2. On energizing the system into a non conducting atmosphere such as air or water 9, a discharge will be noted 8. The discharge will happen continuously till the wire is exhausted.

FIG. 2 (a) shows a typical photograph of an iron alloy wire and FIG. 2(b) shows the discharge at the wire end. The wire length in the pictures is about 60 mm. Lengths as long as meters and as short as centimeters may be used.

FIG. 3 is scanning electron microscope (SEM) photograph of aluminum particles collected from the discharge of an aluminum wire on to a copper surface (see example below). Note that these were hot as discharged and were able to stick to the copper surface. Such particles may be used as filler materials for joining purposes. Note that the size of particles could range from highly sub micron (10⁻³ microns) to several micrometers.

Figure 4:
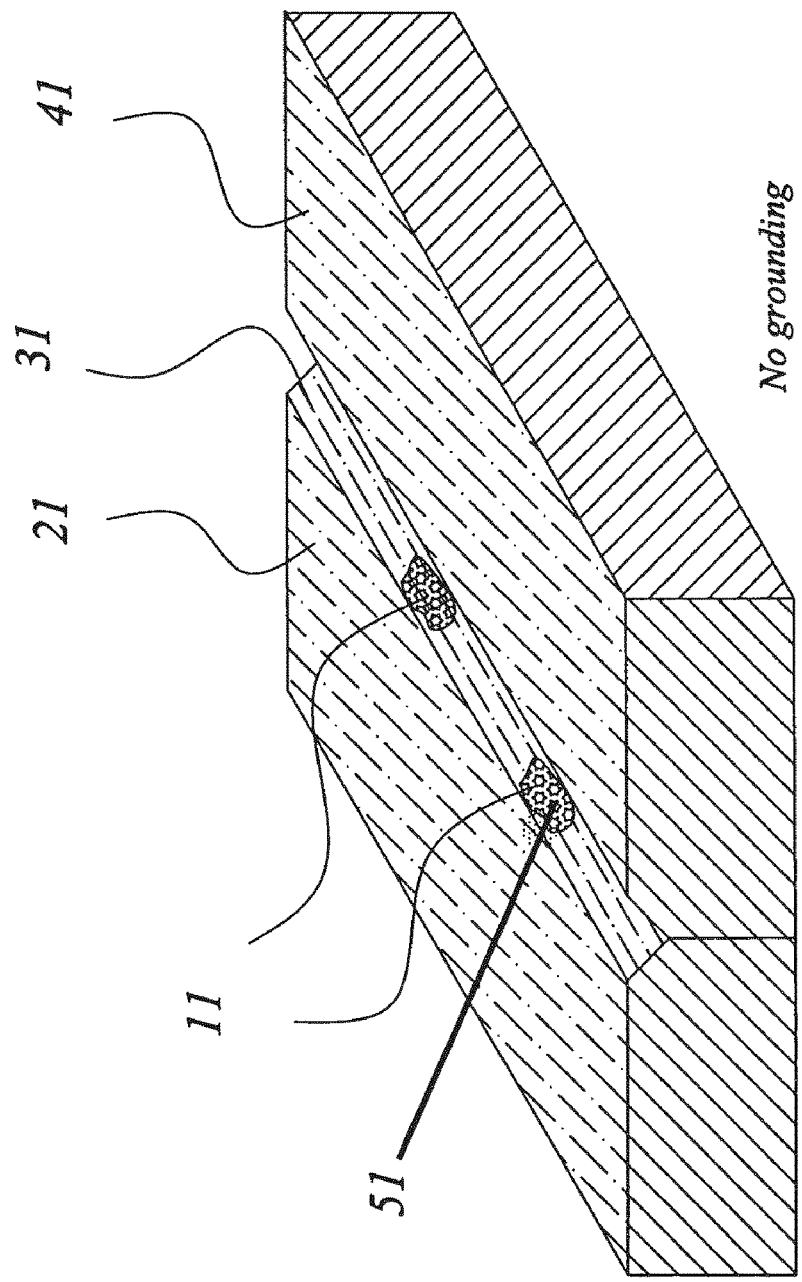
FIG. 4 is diagram depicting particles deposited on a "V" groove, according to an example embodiment of the invention.

FIG. 4 shows how he particles may be deposited on a "V" grooved but joint by discharging wire 51. Here in this figure 21 and 41 are the abutted solid pieces to be joined. 31 is the "V" groove. 11 is the particulate deposit which will weld (join) the material. When the particles impinge they can be liquid particles or solid particles. The deposit may be uniformly applied by a moving (translating) or vibrating or pulsing system of the wire causing the deposit.

DETAILED DESCRIPTION

An approximately 14 MHz commercial generator with a standard pi circuit was connected as shown in the schematic of FIG. 1 one to an aluminum wire ~0.3 mm in diameter. On powering up to about 0.3 kW a sparkler like discharge was noted to occur continuously similar to FIG. 2(b). By continuously in this example we mean several minutes until the aluminum wire (electrode) was exhausted. The terms wire electrode or rod are used interchangeably.

FIG. 3 is the SEM picture shows the particles collected from the discharge. The discharge was now used to fill a weld crater between two abutted aluminum plates. The same apparatus was also used to simply produce heat at the end of the aluminum wire by immersing in water and allowing the water to heat instead (a one sided heater assembly). In this case the discharge was smaller but continuous. An oxide layer could also be formed on the aluminum if the discharge was substantially prevented but the tip allowed to get hot. The same apparatus was made to touch and thus heat a thin wafer of aluminum to heat the aluminum. When the continuous discharge mode was used the particles were hot and were able to transfer heat as well as mass. By particles we mean either spherical oblong, hollow or tubular type of materials. By similar electric potential we mean within about 10%. A reacting gas to the discharge is one which will react with the discharge to make a product which may be useful e. g. steam around the discharging aluminum powders could be introduced which can react with the aluminum to produce hydrogen which can blanket the discharge and make the welding process cleaner.

A joining discharger apparatus could be constructed from standard parts available in the market with which the discharge method could be practiced. Conductive electrodes were used such as aluminum and iron alloy wires. Other conductive electrodes may be used also as also mixtures of metallic and non metallic electrodes. Although it is preferable to have a low resistivity electrode, rod or wire, we anticipate that the high frequency current can travel in high resistivity materials also and several non conductors, semiconductors and composite materials also. The tip may be cooled with gasses liquids or with a contacting lower temperature thermally conducting solid. The cooling gasses or liquids may also be used to cause further reactions.

The basic parameters, given hereafter, to be considered in the operation of the present apparatus are variable, but have an effect on each other so that a stable point of operation can be reached for any given configuration. The parameters are listed as follows:

1. Conductivity (electrical) of electrode, rod or wire
2. Thickness of electrode (the thinner the electrode the easier the discharge)
3. Length of electrode, rod or wire
4. Diameter of the electrode, wire or rod in the event there are several diameters. (we contemplate multiple protruding wires from the same generator)
5. Shape of the electrode (pointed or flat). Flat could be like a scrapper.
6. Type of material that the electrode, wire rod is made of.
7. Type of shielding gas if any inert gas is preferable. Although if used for cooling other gasses may also be used
8. Pressure, in the region of the discharger tip.
9. Electrical values of the variables of the frequency generator.
10. Target (work-piece) surface position.
11. Type of target (work-piece) and configuration.
12. Humidity of the atmosphere and content.
13. Power input level
14. Frequency of the input energy For any given operation, it will be necessary to conduct tests by variance of the above listed parameters, in order to obtain accurate data for proper design formulas.

Clarification of Some of the Terms Used in Claims

In the claims below "low current" is meant to encompass currents lower than one ampere. The term "high temperature" means at least about a 100° C. higher than the ambient or up to the melting point of the lowest melting point of the wire or rod constituent. The term "high potential" refers to over about 100V. The term "freely protruding" rod 2 or wire 7 refers to a protruding wire 7 or rod 2 (such as for example shown in FIGS. 1(a)-1(b) and FIGS. 2(a)-2(b)) where one end is connected to the circuit as shown in FIGS. 1(a)-1(b) and one end is free (i.e. electrically not connected as again shown by example in FIGS. 1(a)-1(b)). A free discharge space is a free space (of air, gas, liquid) surrounding the heated tip of the rod 2 or wire 7.

The invention claimed is:

1. A method for providing a one-sided discharge, comprising:
   providing a generating arrangement capable of producing a high-frequency electrical signal;
   providing a circuit comprising at least one inductor and at least one capacitor, where the circuit is connected to the generating arrangement;
   providing only one consumable electrode electrically connected to the circuit, the one consumable electrode is a wire or a rod, the only one consumable electrode is directly attached and fixed to the circuit, and if a workpiece is present the workpiece does not have to be grounded in any manner; and
   transmitting the high frequency electrical signal to an end of the one consumable electrode to provide a particulate discharge until the one consumable electrode starts to disintegrate over time into a plurality of particles having sizes in a sub-micron range and the one consumable electrode discharges the plurality of particles when the end of the one consumable electrode experiences the high-frequency electrical signal and disintegrates, the end of the one consumable electrode disintegrates in a free discharge space, the free discharge space is a free space.

2. The method of claim 1, wherein the high-frequency electrical signal has a frequency between 0.0001 and 1000 MegaHertz.

3. The method of claim 1, further comprising providing the particulate discharge in proximity to at least one material to spot heat, join or weld the at least one material.

4. The method of claim 1, wherein the sizes include the plurality of particles having some sizes in a range that includes as low as $10^{-3}$ microns.

5. The method of claim 1, wherein the plurality of particles form a coating on a material.

6. The method of claim 1, wherein the one consumable electrode is exhausted.

7. The method of claim 1, wherein the circuit is a pi circuit.

8. The method of claim 1, wherein the particulate discharge is uniform and/or continuous.

9. An apparatus for providing a one-sided particulate discharge, comprising:
   a generating arrangement capable of producing a high-frequency electrical signal;
   a circuit comprising at least one inductor and at least one capacitor, where the circuit is electrically connected to the generating arrangement; and
   only one solid electrode electrically attached to the circuit and the only one solid electrode is adapted to uniformly disintegrate in a free discharge space that is a free space and if a workpiece is present the workpiece does not have to be grounded in any manner and further producing a plurality of particles upon receipt of the signal to emit the plurality of particles.

10. The apparatus of claim 9, wherein the one solid electrode comprises aluminum.

11. The apparatus of claim 9, wherein the one solid electrode comprises an iron alloy.

12. The apparatus of claim 9, wherein the one solid electrode comprises at least one of a non-conducting material or a semi-conducting material.

13. The apparatus of claim 9, wherein the signal is coherent.

14. The apparatus of claim 9, wherein the circuit is a pi circuit.

* * * * *